United States Patent
Disch et al.

(10) Patent No.: US 12,048,950 B2
(45) Date of Patent: Jul. 30, 2024

(54) UNLOADING ARRANGEMENT FOR UNLOADING ITEMS OF WASHWARE WHICH ARE ARRANGED, IN PARTICULAR, ON TRAYS OR TRAY-LIKE OBJECTS

(71) Applicant: ILLINOIS TOOL WORKS INC., Glenview, IL (US)

(72) Inventors: Harald Disch, Elzach (DE); Martin Schrempp, Biberach (DE); Adrian Boldt, Offenburg-Bühl (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 364 days.

(21) Appl. No.: 17/426,943

(22) PCT Filed: Jan. 30, 2020

(86) PCT No.: PCT/US2020/015770
§ 371 (c)(1),
(2) Date: Jul. 29, 2021

(87) PCT Pub. No.: WO2020/163141
PCT Pub. Date: Aug. 13, 2020

(65) Prior Publication Data
US 2022/0097103 A1    Mar. 31, 2022

(30) Foreign Application Priority Data
Feb. 5, 2019   (DE) .................... 10 2019 102 813.2

(51) Int. Cl.
*B07C 5/36*    (2006.01)
*A47L 15/24*   (2006.01)
(Continued)

(52) U.S. Cl.
CPC .............. *B07C 5/36* (2013.01); *A47L 15/247* (2013.01); *B07C 5/04* (2013.01); *B07C 5/34* (2013.01);
(Continued)

(58) Field of Classification Search
CPC .. B07B 13/05; B07C 5/36; B07C 5/04; B07C 5/34; B07C 99/00; A47L 15/247; B65G 47/766; B65G 47/962
See application file for complete search history.

(56) References Cited

U.S. PATENT DOCUMENTS 3,442,368 A * 5/1969 Heifetz ................ B65G 17/385
                                                      198/733
3,520,726 A   7/1970 Gay
(Continued)

FOREIGN PATENT DOCUMENTS

CN   104096683 A   10/2014
CN   106956923 A   7/2017
(Continued)

OTHER PUBLICATIONS

Machine Translation of TW-201628547-A to Cheong et al., Aug. 2016. (Year: 2016).*
(Continued)

*Primary Examiner* — Benjamin L Osterhout
(74) *Attorney, Agent, or Firm* — THOMPSON HINE LLP (57) ABSTRACT

An unloading arrangement (10) for unloading items of washware (5a, 5b, 5c) which are arranged, in particular, on trays or tray-like objects (6), in particular items of washware (5a, 5b, 5c) from place settings. The unloading arrangement (10) has a feed conveyor belt (11) for feeding the items of washware. The unloading arrangement (10) also has a large number of unloading stations (12, 13, 14) arranged one behind the other—as seen in the conveying direction of the (Continued)

feed conveyor belt (11). For successively unloading the feed conveyor belt (11) or for successively unloading the trays or tray-like objects (6), a predefined or predefinable washware group is preferably associated with each unloading station (12, 13, 14) and each unloading station is designed to unload preferably only items of washware of the associated washware group from the washware which is fed by the feed conveyor belt (11).

14 Claims, 4 Drawing Sheets

(51) Int. Cl.
    *B07C 5/04*         (2006.01)
    *B07C 5/34*         (2006.01)
    *B07B 13/05*       (2006.01)
    *B65G 47/76*       (2006.01)
    *B65G 47/96*       (2006.01)

(52) U.S. Cl.
    CPC ............ *B07B 13/05* (2013.01); *B65G 47/766* (2013.01); *B65G 47/962* (2013.01)

(56) References Cited

U.S. PATENT DOCUMENTS

| | | | | |
|---|---|---|---|---|
| 3,530,864 A * | 9/1970 | Wright | ................ | A47L 15/0071 |
| | | | | 134/143 |
| 3,670,911 A * | 6/1972 | Ettlinger, Jr. | ........... | A47L 21/02 |
| | | | | 414/419 |
| 3,682,184 A * | 8/1972 | Jackson | ................... | A47L 15/00 |
| | | | | 134/132 |
| 3,773,058 A * | 11/1973 | Kitterman | ........... | A47L 15/0092 |
| | | | | 134/115 R |
| 3,822,729 A * | 7/1974 | Rochette | ................ | A47B 69/00 |
| | | | | 134/115 R |
| 3,938,533 A * | 2/1976 | Richard | .................. | B07C 99/00 |
| | | | | 209/907 |
| 4,203,696 A * | 5/1980 | Lindberg | ................. | A21B 3/07 |
| | | | | 414/331.11 |
| 4,313,451 A * | 2/1982 | Vilen | .................... | A47L 15/245 |
| | | | | 134/52 |
| 10,647,524 B1 * | 5/2020 | Ma | ........................ | B65G 47/904 |
| 10,647,525 B1 * | 5/2020 | Ma | ........................ | B65G 47/92 |
| 2012/0180820 A1 * | 7/2012 | Hong | .................... | A47L 15/248 |
| | | | | 134/25.2 |
| 2018/0072523 A1 * | 3/2018 | Peters | ................... | B25J 15/0052 |
| 2020/0163522 A1 * | 5/2020 | Peters | ................... | B65G 47/848 |
| 2020/0165079 A1 * | 5/2020 | Birkmeyer | ............... | B25J 15/06 |

FOREIGN PATENT DOCUMENTS

| | | | |
|---|---|---|---|
| CN | 206672218 U | | 11/2017 |
| CN | 107497698 A | | 12/2017 |
| CN | 207170289 U | | 4/2018 |
| CN | 108185939 A | | 6/2018 |
| CN | 208213675 U | | 12/2018 |
| CN | 208426068 U | | 1/2019 |
| DE | 1220187 B | | 6/1966 |
| DE | 1956049 A1 | | 5/1971 |
| DE | 2553439 A1 | | 6/1977 |
| DE | 8534716 U1 | | 9/1986 |
| DE | 102011004853 A1 | | 8/2012 |
| FR | 1351910 A | | 2/1964 |
| TW | 201628547 A | * | 8/2016 |

OTHER PUBLICATIONS

PCT, International Search Report and Written Opinion, International Application No. PCT/US2020/015770; dated Jul. 6, 2020, 15 pages.

* cited by examiner

UNLOADING ARRANGEMENT FOR UNLOADING ITEMS OF WASHWARE WHICH ARE ARRANGED, IN PARTICULAR, ON TRAYS OR TRAY-LIKE OBJECTS

TECHNICAL FIELD

The present invention relates to an unloading arrangement for unloading items of washware which are arranged, in particular, on trays or tray-like objects. The invention also relates to a conveyor dishwasher that is provided with such an unloading arrangement, preferably in a loading region of the conveyor dishwasher.

The conveyor dishwasher according to the invention is in particular a commercial conveyor dishwasher and can be designed as a belt conveyor dishwasher (flight-type warewasher) or as a rack-conveyor dishwasher (rack-conveyor warewasher).

BACKGROUND

Conveyor dishwashers (conveyor warewashers) are used in the commercial sector. In contrast to domestic dishwashers, in which the washware to be cleaned remains in position in the machine while it is being cleaned, in conveyor dishwashers, the washware is conveyed through various treatment zones of the machine.

In conveyor dishwashers, the washware, for example trays, tableware, pots, glasses, cutlery and other utensils to be cleaned, is conveyed through a plurality of treatment zones, for example pre-washing zone(s), main-washing zone(s), post-washing or pre-rinse zone(s), final rinse zone(s), and drying zone(s). For conveying the washware in a conveying direction through the conveyor dishwasher, a conveyor apparatus is used, which generally has compartments for receiving washware. In a belt conveyor dishwasher, the compartments can be formed by supporting fingers on a conveyor belt of the conveyor apparatus. In a rack-conveyor dishwasher, dish racks, in which compartments can be formed for holding the washware to be treated, serve as the conveyor apparatus. It is conceivable here for the dish racks to be conveyed through the rack-conveyor dishwasher by a conveying device.

Usually, the washware to be cleaned is presorted before it is placed on the conveyor belt. For example, the document U.S. Pat. No. 6,530,996 B2 discloses a rack-type dishwasher in which the washware to be treated is fed to the respective treatment zones in a manner presorted into dish racks.

Conveyor dishwashers are used in particular in large facilities, such as refectories and canteens, in order to clean large quantities of soiled washware as economically as possible. Using conveyor dishwashers of the currently known type, it is possible for several hundred place settings to be cleaned per hour. Studies have shown that, on average, each place setting consists as a rule of a tray, a plate, one or two bowls, a drinking glass, and a set of cutlery.

In almost all commercial kitchens, for example staff canteens or refectories, the washware (tableware, drinking glasses, cutlery etc.) used by the consumers is returned on trays. From the return station, the place settings are conveyed into the scullery. Usually, the place settings are conveyed by means of a corresponding feed conveyor. In this case, the place setting is conveyed by a conveyor belt from the return station into the scullery, directly to a loading region of the conveyor dishwasher.

In the loading or inflow region of the conveyor dishwasher, the items of washware are then usually removed manually by the operating staff and sorted into the conveyor belt of the conveyor dishwasher.

As regards trays or tray-like objects, presorting usually takes place in such a way that the operating staff manually removes the set of tableware and cutlery from a tray to be cleaned and the tray is subsequently stacked in front of the conveyor apparatus or in the inflow region (dirty side) of the conveyor dishwasher. The trays from this stack of trays are from time to time placed, in a manner sorted by type, on the conveyor belt and cleaned.

This procedure of sorting by type has the advantage that trays cannot cast spray shadows over smaller items of washware stacked behind the trays. Furthermore, this procedure greatly simplifies the workflow of stacking and unstacking and makes it more efficient compared with mixing the washware with the trays to be cleaned.

While the trays from this stack of trays are placed on the conveyor belt of the conveyor dishwasher in a manner sorted by type and cleaned, it is not possible to clean other washware, for example plates, bowls or other tableware, since the trays to be placed on the conveyor belt usually have to be placed on the conveyor belt transversely to the conveying direction and thus fill up the entire available area of the conveyor belt. Therefore, compared with other types of washware, a relatively large amount of time has to be used for cleaning trays.

Furthermore, the operating staff of the conveyor dishwasher at the machine inlet has to include each tray in their workflow twice: the first time when removing the items of tableware and cutlery from the tray to be cleaned, and the second time when actually placing the trays on the conveyor belt of the conveyer dishwasher.

In the work process described, the manual effort is particularly high. Each item of washware (item of tableware) of each place setting has to be individually removed manually from the tray and placed on the conveyor belt of the dishwasher.

Furthermore, the individual items of cutlery of each place setting have to be removed manually from the tray and likewise fed to the conveyor dishwasher. Subsequently, the above-described treatment of the actual trays takes place.

At a machine capacity of several thousand plates per hour, it is necessary in particular to work as quickly and efficiently as possible, with the result that the physical strain on the operating staff increases.

SUMMARY

On the basis of this problem, the object underlying the present invention is to specify a solution for a conveyor dishwasher of the type mentioned at the beginning, in which it is possible to make the entire washing and rinsing process more efficient, with the result that in particular the working time of the washing staff can be shortened and the resource consumption of the dishwasher can be reduced.

This object is achieved according to the invention by the subject matter of independent claim 1, wherein advantageous developments thereof are specified in the corresponding dependent claims.

Accordingly, the invention relates in particular to an unloading arrangement for unloading items of washware which are arranged on trays or tray-like objects, in particular items of washware from one or more place settings, wherein the unloading arrangement has a feed conveyor belt for feeding the items of washware which are arranged on trays or tray-like objects, and a large number of unloading stations which are arranged one behind the other—as seen in the conveying direction of the feed conveyor belt. For successively unloading the items of washware from the trays or tray-like objects, a predefined or predefinable washware group is associated with each unloading station, and each unloading station is designed to unload preferably only items of washware of the associated washware group from the trays or tray-like objects which are fed by means of the feed conveyor belt.

In this way, it is possible for the place settings fed to the unloading arrangement by means of the feed conveyor belt not only to be unloaded automatically but also to be unloaded in a manner sorted into predefined or predefinable washware groups. Such sorted unloading of the items of washware arranged on the trays or tray-like objects has the advantage that the unloaded items of washware can be sorted into the conveyor belt by type. For this purpose, use is made preferably of a corresponding system for the in particular automatic or at least partially automatic loading of the conveyor dishwasher.

Treating the items of washware in a manner sorted by type in the conveyor dishwasher not only entails the advantage that after, i.e. downstream of, the outflow tunnel of the conveyor dishwasher, the removal of the (cleaned) items of washware can take place more efficiently, but also entails the advantage that, to treat the items of washware in the treatment zones of the conveyor dishwasher, the optimal treatment parameters can always be set.

According to embodiments of the unloading arrangement according to the invention, the latter has a first unloading station with at least one actuable magnet in order to remove items of cutlery which are produced from metal, in particular stainless steel, from trays or tray-like objects which are fed by means of the feed conveyor belt, as required. Alternatively or in addition, it is conceivable to provide at least one further (second) unloading station, which is designed for example for unloading preferably only washware or items of washware of one washware group, which comprises plates, cups, bowls or other items of washware of this kind, from the trays or tray-like objects which are fed by means of the feed conveyor belt.

In this connection, it is conceivable in particular for the at least one second unloading station to have a first region which is designed to unload preferably only washware, including cups and bowls, from the trays or tray-like objects which are fed by means of the feed conveyor belt.

Alternatively or in addition to the first region, the second unloading station can have at least one second region which is connected preferably downstream of the first region of the second unloading station—as seen in the conveying direction of the feed conveyor belt—and is designed to unload preferably only washware, including plates or plate-like objects, from the trays or tray-like objects which are fed by means of the feed conveyor belt.

The second unloading station is in particular designed to successively unload from the trays or tray-like objects which are fed by means of the feed conveyor belt washware of the washware group which comprises, in particular, plates, cups and bowls or other items of washware of this kind, depending, for example, on the size and/or the shape.

In a manner that is particularly easy to realize and yet is effective, at least one wiping device is associated with the second unloading station, wherein this at least one wiping device has a guide which is vertically spaced apart with reference to a plane in which the feed conveyor belt runs at least in the region of the second unloading station in such a way that, when conveyed through the second unloading station by the feed conveyor belt, washware of the washware group which comprises plates, cups and bowls or other items of washware of this kind, but not trays or tray-like objects, hits the guide and is deflected out of the conveying direction which is prespecified by the feed conveyor belt.

Thus, it is, for example, conceivable for a first wiping device to be associated with the second unloading station, which first wiping device has a guide which is vertically spaced apart with reference to a plane in which the feed conveyor belt runs at least in the region of the second unloading station in such a way that, when conveyed through the second unloading station by the feed conveyor belt, washware of the washware group which comprises cups and bowls or other items of washware of this kind, but not plates, saucers, trays, tray-like objects or other items of washware of this kind, hits the guide and is deflected out of the conveying direction which is prespecified by the feed conveyor belt.

Furthermore, a second wiping device which is connected downstream of the first wiping device—as seen in the conveying direction of the feed conveyor belt—can be associated with the second unloading station, which second wiping device has a guide which is vertically spaced apart with reference to a plane in which the feed conveyor belt runs at least in the region of the second unloading station in such a way that, when conveyed through the second unloading station by the feed conveyor belt, washware of the washware group which comprises plates and saucers or other items of washware of this kind, but not trays, tray-like objects or other items of washware of this kind, hits the guide of the second wiping device and is deflected out of the conveying direction which is prespecified by the feed conveyor belt.

Alternatively or in addition to the abovementioned possible embodiments of the second unloading station, it is conceivable for at least one washware pusher device to be associated therewith, which washware pusher device has a movable manipulator region which can be retracted into a region vertically above the feed conveyor belt as required in order to deflect items of washware out of the conveying direction which is prespecified by the feed conveyor belt.

Furthermore, it is conceivable for the second unloading station to have a tilting region in which trays or tray-like objects which are fed by means of the feed conveyor belt are inclined or can be inclined in relation to the horizontal in such a way that items of washware slide off the tray.

Preferably, the unloading arrangement is designed to unload, preferably automatically or at least partially automatically, the washware which is fed to the loading region of the conveyor dishwasher by means of the feed conveyor belt from the feed conveyor belt, or possibly from trays which are fed by means of the feed conveyor belt, in a manner sorted into predefined or predefinable washware groups.

The unloading arrangement can be designed for example to sort the washware which is fed by means of the feed conveyor belt into at least the following washware groups:
  a first washware group, which comprises cutlery and/or items of cutlery which are produced from metal, in particular stainless steel;
  a second washware group, which comprises cups, glasses and/or bowls; and
  a third washware group, which comprises plates and/or items of washware that are flat compared with cups, glasses and/or bowls.

In addition, it is optionally conceivable for the individual unloading stations of the unloading arrangement to be designed at least in part to load or introduce the washware unloaded accordingly from the feed conveyor belt in an appropriately sorted manner in the unloading station automatically onto a conveyor belt of the conveyor dishwasher.

With the unloading arrangement according to the invention, it is thus possible to configure a conveyor dishwasher with different expansion stages for automating manual loading and unloading work steps. A first expansion stage can consist in the conveyor dishwasher having, in addition to a main conveyor belt, a tray track (tray conveyor belt), wherein this tray track is arranged preferably next to the main conveyor belt, parallel thereto.

In this expansion stage, the place settings, as described above, are, for example, placed on the feed conveyor belt of the loading system either directly by the consumer or by the washing staff. The feed conveyor belt then conveys the place settings to the unloading arrangement in the inflow or loading region of the conveyor dishwasher. There, the items of cutlery and tableware are removed (unloaded) from the trays in a presorted manner with the aid of the unloading stations. The items of tableware removed in an automated manner in the unloading stations are then sorted, for example manually, into the main conveyor belt of the conveyor dishwasher. The removed items of cutlery can be collected in dish racks and be cleaned subsequently in the conveyor dishwasher.

With the first expansion stage, the trays are no longer sorted into the dishwasher manually. They are conveyed further in a parallel manner in the direction of the machine inlet of the conveyor dishwasher by means of the feed conveyor belt and are introduced automatically onto a special tray conveyor belt (tray track) there by means of a clocking-in apparatus or placement apparatus. This tray track runs preferably parallel to the main conveyor belt.

According to a second expansion stage, in addition to the abovementioned tray track, a separate cutlery track may be provided. This cutlery track runs preferably likewise parallel to and directly next to the tray track.

As described above, the place settings are conveyed to the inflow or loading region of the conveyor dishwasher by means of the feed conveyor belt of the unloading arrangement. In this second expansion stage, the items of tableware are removed from the fed trays in at least one unloading station and sorted into the main conveyor belt manually or automatically with the aid of a loading arrangement. The tray and the cutlery located thereon remain on the feed conveyor belt. The latter is conveyed further to an unloading station for cutlery, wherein this unloading station may have a clocking-in apparatus for cutlery, for example a cutlery lifting magnet. Here, the items of cutlery can be removed automatically from the trays and introduced into the cutlery track of the conveyer dishwasher. Subsequently, the tray is conveyed to the clocking-in apparatus, where it is loaded automatically into the tray track of the conveyor dishwasher.

In order additionally to further reduce the number of manual handling steps required for loading the conveyor dishwasher, according to embodiments of the invention, items of tableware which have been removed from the feed conveyor belt in at least one unloading station can be sorted automatically into the transport dishwasher and in particular into a main conveyor belt of the conveyor dishwasher.

In this way, it is thus possible overall to save on manual work steps and thus the amount of work for the washing staff, since the washing staff ideally no longer has to manually load the conveyor dishwasher. In particular, the system according to the invention ensures operation of the conveyor dishwasher that is as ergonomic and user-friendly as possible, since manual unloading of the fed place settings and manual loading of the items of washware into the conveyor dishwasher is no longer necessary.

In addition, with the unloading arrangement according to the invention, the cleaning result of the dishwasher is improved, since all of the washware of a defined washware group is oriented uniformly on the main conveyor belt of the conveyor dishwasher. Furthermore, the unloading process can be simplified, since each washware group can be transported through the conveyor dishwasher on a defined track and thus arrives at the unloading region of the conveyor dishwasher in an already presorted manner.

According to embodiments of the unloading arrangement according to the invention, the latter is designed to automatically differentiate washware which is fed by means of the feed conveyor belt and is to be treated in the conveyor dishwasher. For this purpose, a washware detector apparatus can be associated with at least one unloading station or the unloading arrangement, which washware detector apparatus serves to sense the type of the items of washware (plates, cups, bowls, cutlery, trays, drinking glasses, etc.) which are fed by means of the feed conveyor belt and then to associate each sensed type of washware with a predefined or predefinable washware group.

To this end, a corresponding washware detector apparatus can be associated with the at least one unloading station or the unloading arrangement, which washware detector apparatus serves to sense the type, size, material and/or shape of the items of washware which are fed by means of the feed conveyor belt.

The term "washware detector apparatus" used herein should be understood as meaning any detection apparatus that is designed to sense and to determine the type of washware which is fed by means of the feed conveyor belt. It is conceivable here in particular for the washware detector apparatus to have at least one detector device, with which the size, shape and/or material of the items of washware which are fed by means of the feed conveyor belt can be sensed.

According to conceivable embodiments, the washware detector apparatus can have at least one preferably optically, inductively or capacitively operating detector device, such that, in order to identify the type of washware, the size, shape and/or material of the corresponding item of washware can be sensed. However, other detector types are suitable as detector device, for example inductively operating proximity sensors, light sensors, light curtains, laser scanners, 3D lasers, cameras, rotary encoders, etc.

The washware detector apparatus is arranged preferably in the inflow region of the unloading arrangement or upstream of an unloading station of the unloading arrangement, in order that the type of washware which is fed can be sensed and the corresponding unloading station actuated.

BRIEF DESCRIPTION OF THE DRAWINGS

In the following text, exemplary embodiments of the solution according to the invention are described in more detail with reference to the drawings.

In the drawings.

DETAILED DESCRIPTION

The aim of the present invention is to reduce the number of manual handling steps as far as possible during operation of a conveyor dishwasher 1, in order to reduce the workload of the washing staff and ultimately make it possible to exploit the maximum capacity of the conveyor dishwasher 1.

For this purpose, an unloading arrangement 10 for unloading items of washware 5a, 5b, 5c which are arranged on trays or tray-like objects 6, in particular items of washware 5a, 5b, 5c from a place setting, is proposed. The unloading arrangement 10 is arranged preferably in the loading region of the conveyor dishwasher 1 and serves to make it possible to sort in particular plates and bowls 5b, 5c, or items of washware of this kind, automatically into a main conveyor belt 2 of the conveyor dishwasher 1. In this way, manual work steps and thus the amount of work for the washing staff is reduced, since the washing staff does not always have to manually load the conveyor dishwasher 1.

Furthermore, the solution according to the invention ensures operation of the conveyor dishwasher 1 that is as ergonomic and user-friendly as possible, since manual loading of the items of washware 5a, 5b, 5c, 6 into the conveyor dishwasher 1 is no longer necessary.

In particular, however the cleaning result of the conveyor dishwasher 1 is also improved, since it is possible to orient all of the washware 5a, 5b, 5c, 6 in a uniform manner for example on a main conveyor belt 2 of the conveyor dishwasher 1. In this way, spray shadows during the wetting of the items of washware 5a, 5b, 5c, 6 with liquid in the treatment zones of the conveyor dishwasher 1 can be effectively avoided or reduced.

Ultimately, with the solution according to the invention, it is also possible for the unloading process of the conveyor dishwasher 1 to be simplified, since it is possible for each kind of washware to be conveyed through the conveyor dishwasher 1 on a defined track or on a defined conveyor belt 2, 3, 4, and thus to arrive at the unloading region of the conveyor dishwasher 1 in an already presorted manner.

Figure 1:
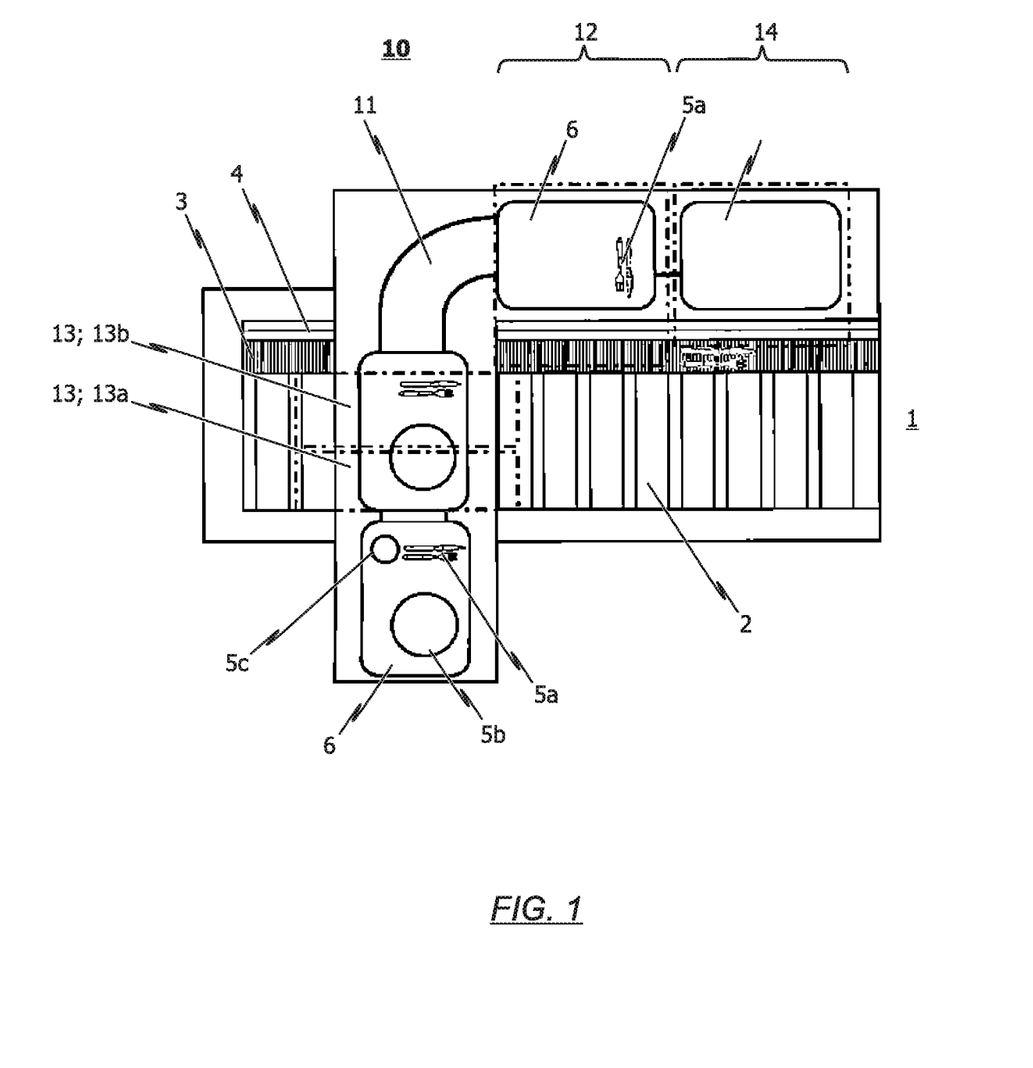
FIG. 1 schematically shows a plan view of one exemplary embodiment of the unloading arrangement according to the invention.

As is illustrated schematically in FIG. 1, the unloading arrangement 10 is provided preferably in a loading region of the conveyor dishwasher 1, which is shown only partially.

The conveyor dishwasher 1 has a conveyor apparatus (main conveyor belt 2, cutlery conveyor belt 3, tray conveyor belt 4) for transporting washware 5a, 5b, 5c, 6 in a conveying direction through the conveyor dishwasher 1. The conveyor apparatus is designed in particular to allow a plurality of washware types arranged alongside one another to be treated simultaneously in the treatment zones of the conveyor dishwasher 1, in order in this way to make the entire washing and rinsing process more efficient, with the result that in particular working time of the washing staff can be shortened and the resource consumption of the dishwasher reduced.

The conveyor dishwasher 1 considered herein has at least one washing zone, for example a pre-washing zone and a main washing zone, which is arranged after the pre-washing zone as seen in the conveying direction of the washware. As seen in the conveying direction, after the at least one washing zone preferably a post-washing zone is provided, and after the post-washing zone at least one final rinsing zone, for example a fresh water final rinsing zone and/or a pump final rinsing zone, is provided. As seen in the conveying direction of the washware, a drying zone follows the at least one final rinsing zone.

The respective zones of the conveyor dishwasher 1 can be separated from one another via separating curtains. It is also conceivable for the inflow tunnel of the conveyor dishwasher 1, which is provided after the loading region of the conveyor dishwasher 1 as seen in the conveying direction, to be separated from the inlet of the conveyor dishwasher 1 via a separating curtain. As a result of the provision of separating curtains, overspraying of washing liquid and final rinse liquid and the escape of vapors from the conveyor dishwasher 1 can be prevented.

The treatment zones of the conveyor dishwasher 1 have associated spray nozzles. These spray nozzles serve to spray liquid onto the washware 5a, 5b, 5c, 6 to be treated when the latter is conveyed through the respective treatment zones by the conveyor apparatus. The individual spray systems of the treatment zone ensure that the washware 5a, 5b, 5c, 6 to be treated is spray-washed from the top side and from the underside.

Provided in the loading region of the conveyor dishwasher 1 in the embodiment illustrated schematically in FIG. 1 is an unloading arrangement 10 for unloading items of washware 5a, 5b, 5c, which are fed to the loading region of the conveyor dishwasher 1 on a feed conveyor belt 11, and provided for loading the conveyor dishwasher 1 with these items of washware 5a, 5b, 5c.

The unloading arrangement 10 is also designed to sort the washware 5a, 5b, 5c, 6 which is fed to the loading region of the conveyor dishwasher 1 by means of the feed conveyor belt 11 into predefined or predefinable washware groups.

Specifically, in the exemplary embodiment shown in FIG. 1, the unloading arrangement 10 is designed to sort the washware 5a, 5b, 5c, 6 which is fed by means of the feed conveyor belt 11 into the following washware groups:

a first washware group, which comprises cutlery and/or items of cutlery 5a which are produced from a metal, in particular stainless steel;

a second washware group, which comprises trays and tray-like objects 6;

a third washware group, which comprises cups, bowls 5c or items of washware of this kind; and a fourth washware group, which comprises plates, saucers 5b or items of washware of this kind.

The expression "cups, bowls 5c or items of washware of this kind" used herein should be understood as meaning generally items of washware which, in their state standing on a surface, have a height that corresponds at least substantially at least to the height that a cup or a bowl has. According to exemplary embodiments, these are items of washware which have a height of at least 20 mm, preferably at least 25 mm and more preferably at least 30 mm.

Alternatively or in addition, the expression "cups, bowls 5c or items of washware of this kind" should be understood as meaning generally items of washware which have a height that is greater than the height of a standard plate (flat).

By contrast, the expression "plates, saucers 5b or items of washware of this kind" used herein should be understood as meaning generally items of washware which, in their state standing on a surface, have a height that is less than the height that a cup or a bowl has. According to exemplary embodiments, these are items of washware which have a height of less than 20 mm and preferably less than 15 mm.

However, the expression "plates, saucers 5b or items of washware of this kind" used herein is not intended to cover trays or tray-like objects 6 or items of cutlery 5a.

The unloading arrangement 10 according to the invention, one exemplary embodiment of which is shown schematically in plan view for example in FIG. 1, has preferably a plurality of unloading stations 12, 13, 14, wherein a loading arrangement is associated with each of these in order to automatically load the conveyor dishwasher 1 and specifically appropriate tracks or regions of the conveyor belt (for example main conveyor belt 2, cutlery conveyor belt 3, tray conveyor belt 4) of the conveyor dishwasher 1 with washware 5a, 5b, 5c, 6 of one of the predefined or predefinable washware groups.

For example, in the solution schematically illustrated in FIG. 1, a first loading arrangement can be provided, which is designed to automatically load the conveyor dishwasher 1 and specifically a cutlery track 3 running parallel to a main conveyor belt 2 of the conveyor dishwasher 1 with washware of the first washware group (i.e. with cutlery and/or items of cutlery 5a which are produced from metal, in particular stainless steel).

Furthermore a second loading arrangement can be used, which is designed to automatically load the conveyor dishwasher 1 and specifically a tray track 4 running parallel to the main conveyor belt 2 of the conveyor dishwasher 1 with washware of the second washware group (i.e. with trays and tray-like objects 6).

In addition, in the exemplary embodiment shown in FIG. 1, a third loading arrangement can be used, which is designed to automatically load the conveyor dishwasher 1 and specifically the main conveyor belt 2 of the conveyor dishwasher 1 with washware of the third and/or fourth washware group (i.e. with cups, bowls 5c and/or plates 5b).

In this case, it is possible for example for the third loading arrangement to be arranged upstream of the first and second loading arrangement—as seen in the conveying direction of the feed conveyor belt 11. Furthermore, in the embodiment shown in FIG. 1, it is possible for the first loading arrangement to be arranged upstream of the second loading arrangement.

The unloading arrangement 10 has the abovementioned feed conveyor belt 11, in order to feed the items of washware 5a, 5b, 5c, 6 to be cleaned to the loading region of the conveyor dishwasher 1. Preferably, the feed conveyor belt 11 is designed to feed items of washware 5a, 5b, 5c which are arranged on trays or tray-like objects 6 to the loading region of the conveyor dishwasher 1. In this way, corresponding place settings can be conveyed continuously into the loading region of the conveyor dishwasher 1.

However, the items of washware 5a, 5b, 5c (items of tableware and items of cutlery) can also be placed directly on the feed conveyor belt 11.

As schematically indicated in FIG. 1, the unloading arrangement 10 includes a large number of unloading stations 12, 13, 14 which are arranged one behind the other—as seen in the conveying direction of the feed conveyor belt 11. In this connection, it is advantageous for each unloading station 12, 13, 14 of the unloading arrangement 10 to also be designed as a corresponding loading station. In other words, the respective unloading stations 12, 13, 14 of the unloading arrangement 10 preferably serve not only to successively unload the trays or tray-like objects 6 which are fed by means of the feed conveyor belt 11 but also to sort the items of washware 5a, 5b, 5c unloaded from the trays or tray-like objects 6 preferably automatically into a corresponding conveyor belt 2, 3 of the conveyor dishwasher 1.

Specifically, in the exemplary embodiment of the unloading arrangement 10 according to the invention that is schematically illustrated in FIG. 1, the individual unloading stations 12, 13, 14 are designed to unload preferably only items of washware 5a, 5b, 5c of a particular washware group which is associated with the corresponding unloading station 12, 13, 14 from the trays or tray-like objects 6 which are fed by means of the feed conveyor belt 11, such that the unloading of the trays or tray-like objects 6 takes place in a manner "sorted by type".

The expression "sorted by type" used herein should be understood as meaning in particular unloading of the trays or tray-like objects 6 which are fed by means of the feed conveyor belt 11, wherein for each unloading station 12, 13, washware 5a, 5b, 5c of a particular washware group is removed from the trays or tray-like objects 6.

In the unloading arrangement 10 shown in the schematic FIG. 1, use is made of a first unloading station 13, 13a, which is designed to remove, in an automated manner, items of washware of a washware group which includes bowls or items of washware 5c of this kind from the tray 6 which is fed by means of the feed conveyor belt 11 and to sort it automatically into the main conveyor belt 2 of the conveyor dishwasher 1.

Subsequently, the trays 6 are conveyed to a second unloading station 13, 13b with the aid of the feed conveyor belt 11. The second unloading station 13, 13b is designed to remove items of washware of the washware group which includes in particular plates or plate-like items of washware 5b from the tray 6 which is fed by means of the feed conveyor belt 11 and preferably likewise to load them automatically into the main conveyor belt 2 of the conveyor dishwasher 1.

Subsequently, the partially unloaded trays or tray-like objects 6 are fed to a third unloading station 12, in which items of cutlery 5a that may be present on the trays 6 are unloaded from the trays 6. In this connection, it is conceivable for example for the third unloading station 12 to have an actuable magnet, in order to remove items of cutlery 5a which are produced from metal, in particular stainless steel, from trays or tray-like objects 6 which are fed by means of the feed conveyor belt 11, as required.

The third unloading station 12 is furthermore designed to sort the items of cutlery 5a removed from the trays or tray-like objects 6 preferably automatically into a cutlery belt 3 of the conveyor dishwasher 1 or to deposit them on a corresponding cutlery belt 3 of the conveyor dishwasher 1.

In the exemplary embodiment of the unloading arrangement 10 according to the invention which is shown in FIG. 1, use is also made of a fourth unloading station 14, which is connected downstream of the third unloading station 12—as seen in the conveying direction of the feed conveyor belt 11. In this fourth unloading station 14, waste that may be present on the trays 6, for example serviettes, is removed preferably automatically. Subsequently, the trays or tray-like objects 6 are sorted preferably automatically into a corresponding tray track 4 of the conveyor dishwasher 1.

Figure 2:
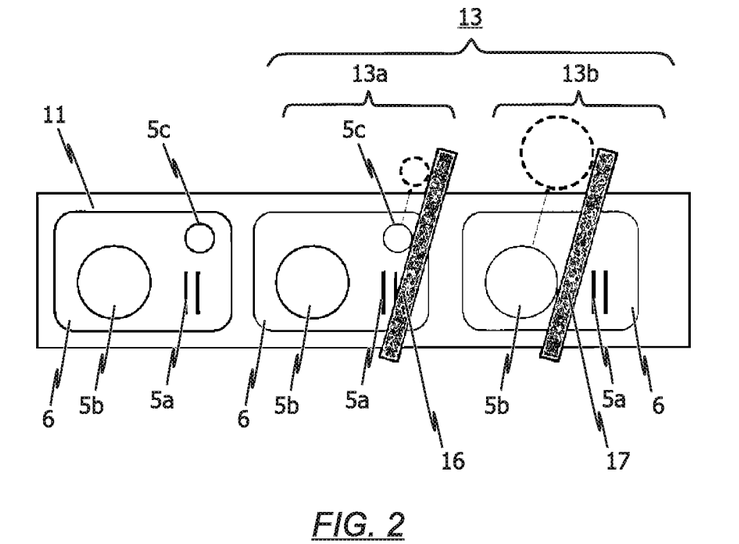
FIG. 2 schematically shows a plan view of one exemplary embodiment of an unloading station of the unloading arrangement according to FIG. 1.

FIG. 2 schematically shows a plan view of a further exemplary embodiment of the unloading arrangement 10 according to the invention. In this embodiment, use is made of an unloading station 13 which is designed to unload preferably only washware of one washware group, which comprises plates 5b, cups and bowls 5c or other items of washware of this kind, from the trays or tray-like objects 6 which are fed by means of the feed conveyor belt 11, and to sort these unloaded items of washware 5b, 5c preferably automatically into a corresponding conveyor belt, in particular into a main conveyor belt 2, of the conveyor dishwasher 1. This unloading station 13 is, in the embodiment illustrated schematically in FIG. 2, the first unloading station of the unloading arrangement 10—as seen in the conveying direction of the feed conveyor belt 11. This order should not be considered to be limiting, however.

In an embodiment of the unloading arrangement 10 that is not shown in the drawings, a second unloading station 12 is associated with the first unloading station 13—as seen in the conveying direction of the feed conveyor belt 11—, with which the washware group that comprises plates 5b, cups and bowls 5c or other items of washware of this kind is associated, which second unloading station 12 is designed to remove items of cutlery 5a which are produced from metal, in particular stainless steel, from the trays or tray-like objects 6 which are fed by means of the feed conveyor belt 11 (and to sort the removed items of cutlery 5a preferably automatically in particular in a cutlery belt 3 (cutlery track) of the conveyor dishwasher 1).

This second unloading station 12 can have for example in turn an actuable magnet.

Alternatively, however, it is also conceivable for the tray 6 which is fed by means of the feed conveyor belt 11, or the tray-like object 6 which is fed by means of the feed conveyor belt 11, to be inclined, in the second unloading station 12, appropriately in the direction of a conveyor belt of the conveyor dishwasher 1 and in particular in the direction of a cutlery belt 3 (cutlery track) of the conveyor dishwasher 1, in such a way that the items of cutlery 5a which are present on the tray or the tray-like object 6 slide onto the conveyor belt (the cutlery track 3) of the conveyor dishwasher 1 due to the force of gravity.

As seen in the conveying direction of the feed conveyor belt 11, downstream of the second unloading station 12, with which the washware group "items of cutlery 5a" is associated, an unloading station 14 is optionally arranged, in which waste is removed preferably automatically from the trays or tray-like objects 6 which are fed by means of the feed conveyor belt 11. Subsequently, the unloaded, i.e. cleared, trays or tray-like objects 6 can then be sorted, likewise preferably automatically, into a corresponding tray track 4 of the conveyor dishwasher 1.

FIG. 2 schematically shows a plan view of one exemplary embodiment of an unloading station 13 of the unloading arrangement 10 according to the invention. This unloading station 13 is configured to successively unload first cups and bowls 5c and then plates 5b, or items of washware of correspondingly flat design, from the feed conveyor belt 11.

To this end, the unloading station 13 according to FIG. 2 has a first region 13a and a further, second region 13b which is arranged downstream of the first region 13a—as seen in the conveying direction of the feed conveyor belt 11. The first region 13a of the unloading station 13 is in this case designed to unload preferably only washware which includes cups and bowls 5c from the trays or tray-like objects 6 which are fed by means of the feed conveyor belt 11. The second region 13b of the unloading station 13, by contrast, is designed to unload preferably only washware which includes plates 5b or plate-like objects from the already partially unloaded trays or tray-like objects 6 which are fed by means of the feed conveyor belt 11.

In particular—as is described in more detail below with reference to the illustration in FIG. 3—the unloading station 13 is designed to successively unload from the trays or tray-like objects 6 which are fed by means of the feed conveyor belt 11 washware of the washware group which comprises in particular plates 5b, cups and bowls 5c or other items of washware of this kind, depending in particular on the size and/or shape.

According to one embodiment of the unloading station 13, the latter has at least one wiping device 16, 17, wherein this at least one wiping device 16, 17 has a guide which is vertically spaced apart with reference to a plane in which the feed conveyor belt 11 runs at least in the region of the unloading station 13 in such a way that, when conveyed through the unloading station 13 by the feed conveyor belt 11, washware of the washware group which comprises plates 5b, cups and bowls 5c or other items of washware of this kind, but not trays or tray-like objects 6 and/or items of cutlery 5a, hits the guide and is deflected out of the conveying direction which is prespecified by the feed conveyor belt 11.

Figure 3:
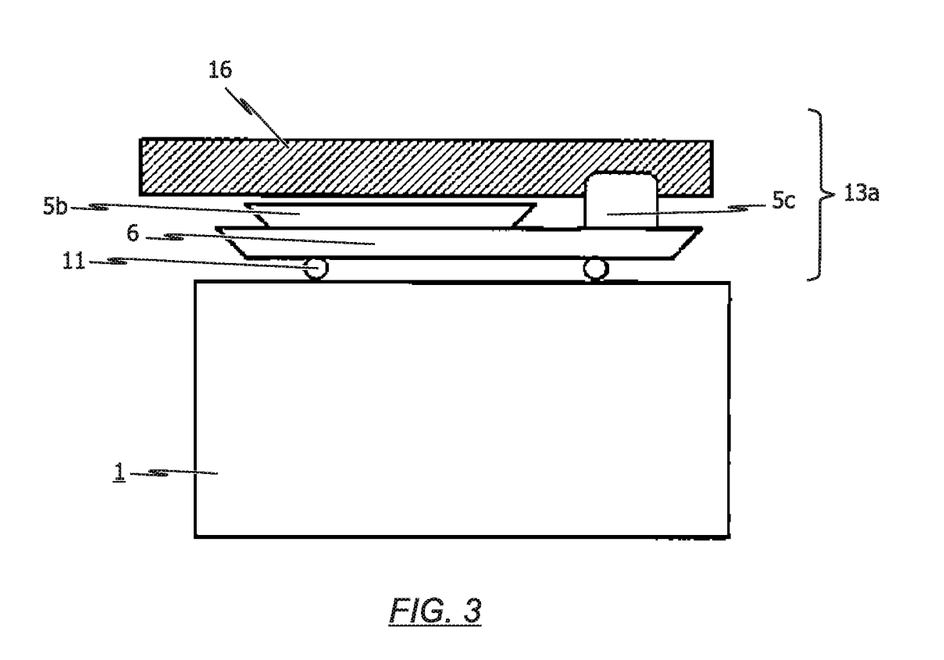
FIG. 3 schematically shows a side view of the exemplary embodiment of the unloading station according to FIG. 2.

In the embodiment illustrated schematically in FIG. 2 and FIG. 3, a first wiping device 16 is associated with a first region 13a of the unloading station 13, which first wiping device has a guide which is vertically spaced apart with reference to a plane in which the feed conveyor belt 11 runs at least in the first region 13a of the unloading station 13 in such a way that, when conveyed through the first region 13a of the unloading station 13 by the feed conveyor belt 11, washware of the washware group which comprises cups and bowls 5c or other items of washware of this kind, but not plates and saucers 5b, trays and tray-like objects 6, items of cutlery 5a or other items of washware of this kind, hits the guide and is deflected out of the conveying direction which is prespecified by the feed conveyor belt 11.

The unloading station 13 according to the exemplary embodiment schematically shown in FIG. 2 and FIG. 3 furthermore has, in a second region 13b of the unloading station 13, at least one second wiping device 17, which is connected downstream of the first wiping device 16 and likewise has a corresponding guide.

The guide of the second wiping device 17 is vertically spaced apart with reference to a plane in which the feed conveyor belt 11 runs at least in the second region 13b of the unloading station 13 in such a way that, when conveyed through the second region 13b of the unloading station 13 by the feed conveyor belt 11, washware of the washware group which comprises plates and saucers 5b or other items of washware of this kind 5a, 5b, 5c, 6, but not trays and tray-like objects 6, (possibly) items of cutlery 5a, or other items of washware of this kind, hits the guide and is deflected out of the conveying direction which is prespecified by the feed conveyor belt 11.

The vertical spacing of the guides of the wiping devices 16, 17 with respect to the plane in which the feed conveyor belt runs is preferably settable in a variable manner, in order for it to be possible to react to different sizes (heights) of the items of washware to be unloaded.

Alternatively or in addition to the wiping device(s) 16, 17 which are used in the unloading station 13, it is also conceivable, however, for at least one washware pusher device to be associated with the unloading station 13, wherein this at least one washware pusher device has a movable manipulator region (for example a robot arm or the like) which can be retracted into a region vertically above the feed conveyor belt 11 as required in order to deflect items of washware 5b, 5c, preferably in a targeted manner, out of the conveying direction which is prespecified by the feed conveyor belt 11 and thus to unload the items of washware 5b, 5c from the tray or tray-like object 6.

Figure 4:
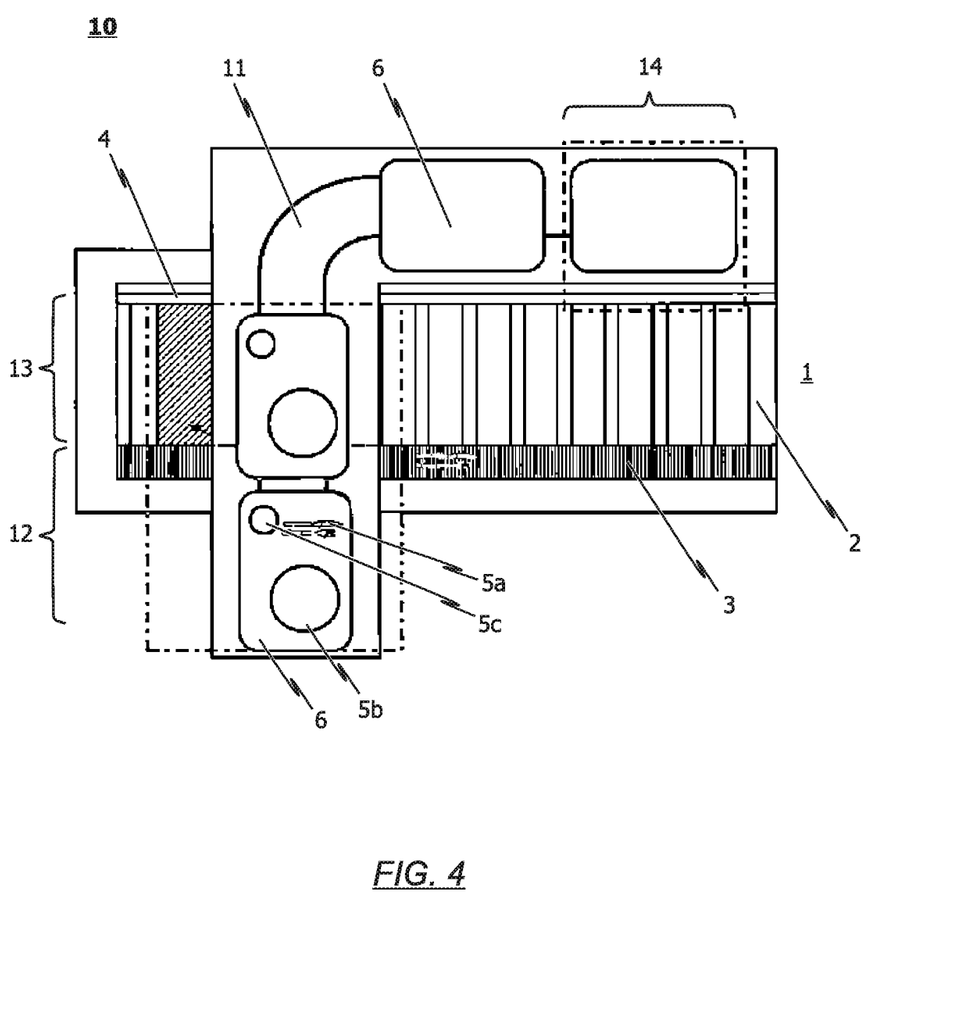
FIG. 4 schematically shows a plan view of a further exemplary embodiment of the unloading arrangement according to the invention.
Figure 5:
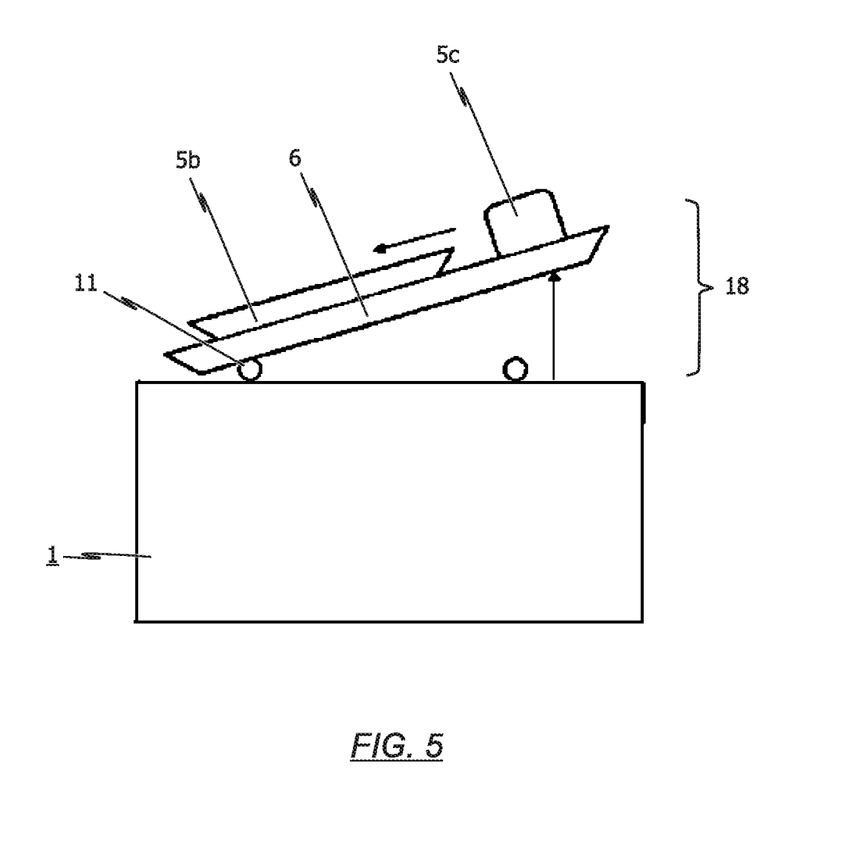
FIG. 5 schematically shows a side view of an unloading station of the unloading arrangement according to FIG. 4.

In the further exemplary embodiment of the unloading arrangement 10 that is shown schematically in FIG. 4, a tilting region 18 is used for unloading the trays or tray-like objects 6 which are fed by means of the feed conveyor belt 11. This tilting region 18 is—as indicated schematically in FIG. 5.—designed such that the trays or tray-like objects 6 which are fed by means of the feed conveyor belt 11 are raised laterally such that the items of washware 5a, 5b, 5c that may still be present on the tray or tray-like object 6 slide off the tray or tray-like object 6 due to the force of gravity and are unloaded in this way.

In summary, in embodiments of the unloading arrangement 10 according to the invention, the unloading of bowls 5c and plates 5b takes place with the aid of one or more wiping devices 16, 17. Here, use is made of the knowledge that bowls 5c generally have a greater height than plates 5b.

For this reason, first of all the bowls 5c or items of washware of this kind can be unloaded from the trays or tray-like objects 6 which are fed to the corresponding unloading station 13 by means of the feed conveyor belt 11 by means of a first wiping device 16. The wiping device 16 is set up so as to push the bowls 5c or items of washware of this kind from the tray or tray-like object 6.

After the bowl 5c or the corresponding item of washware has been pushed from the tray or tray-like object 6, this item of washware 5c can be sorted directly into a conveyor belt of the conveyor dishwasher 1. Alternatively, it is also possible for an additional loading apparatus to support the sorting operation for these items of washware 5c.

As illustrated in FIG. 3, the wiping device 16 for bowls 5c or similar washware is attached at such a height that plates 5b or other items of washware 5a, 6 can pass the wiping device 16. In the next step, the already partially unloaded tray 6 with the plates 5b still arranged on the tray 6 passes through a second wiping device 17. The wiping device 17 in the second wiping region is attached at the height of the plate 5b and likewise set up.

The advantage of using two or more wiping devices 16, 17 resides in the automatic separation of plates 5b and bowls 5c. Thus, plates 5b and bowls 5c can be sorted in a targeted manner into a respective conveying track (conveyor belt) of the conveyor dishwasher 1.

An alternative to unloading by means of wiping devices 16, 17 is unloading by tilting the tray or tray-like object 6. In this case, the tray or tray-like object 6 is raised laterally such that the items of washware, for example plates and bowls 5b, 5c, which are still arranged on the tray or tray-like object 6 can slide off the tray or tray-like object 6.

Before the tray or tray-like object 6 is tilted, first of all the cutlery (items of cutlery 5a) should be removed from the tray or tray-like object 6 by a clocking-in apparatus in the form of a cutlery lifting magnet, and be automatically sorted into the cutlery track 3 of the conveyor dishwasher 1. This takes place preferably in an unloading station 12, which is provided upstream of the tilting region 18—as seen in the conveying direction of the feed conveyor belt 11.

In the next step, the raising or tilting of the tray or tray-like object 6 takes place in the tilting region 18 of the corresponding unloading station 13.

The (lateral) raising of the tray 6 can take place either actively by means of external application of force or passively by means of an inclined plane integrated in the feed conveyor belt 11.

It should be noted here that—if, apart from the cutlery unloading station 12, no further unloading stations are provided, all the items of washware that are still located on the tray or tray-like object 6, i.e. in particular plates and bowls 5b, 5c, slide down off the tray 6 in a disorderly fashion in the tilting region 18. For this reason, after the unloading of the washware, presorting is necessary. This has the object of sorting plates and bowls 5b, 5c into the appropriate conveying track of the conveyor dishwasher 1.

Alternatively, however, it is also conceivable to provide, upstream of the tilting region 18, as seen in the conveying direction of the feed conveyor belt 11, at least one wiping device 16, 17 by means of which for example bowls 5c or washware of this kind are unloaded from the trays or tray-like objects 6, wherein only the items of washware that then remain, for example plates 5b or plate-like objects, slide down off the tray 6 due to the force of gravity in the tilting region 18.

The invention is not limited to the exemplary embodiments shown in the drawings, but rather is the result of joint consideration of all of the features disclosed herein.

In particular, the invention is not limited to unloading items of washware 5a, 5b, 5c from trays or tray-like objects 6. Rather, these items of washware 5a, 5b, 5c can also be unloaded directly from the feed conveyor belt 11.

The invention claimed is:

1. An unloading arrangement for unloading items of washware which are arranged on trays or tray-like objects, wherein the unloading arrangement comprises:
 a feed conveyor belt for feeding the items of washware which are arranged on trays or tray-like objects and are to be unloaded; and
 multiple unloading stations which are arranged one behind the other, as seen in a conveying direction of the feed conveyor belt;
 wherein, for successively unloading the items of washware from the trays or tray-like objects, a predefined or predefinable washware group is associated with each unloading station and each unloading station is designed to unload only items of washware of the associated washware group;
 wherein at least one wiping device is associated with at least one unloading station, wherein the at least one wiping device has a guide which is vertically spaced apart with reference to a plane in which the feed conveyor belt runs through the at least one unloading station in such a way that, when conveyed through the at least one unloading station by the feed conveyor belt, washware of the washware group which comprises plates, cups and bowls, but not the trays or tray-like objects, hits the guide and is deflected out of the conveying direction of the feed conveyor belt, wherein a vertical spacing of the guide from the plane is variably adjustable.

2. The unloading arrangement as claimed in claim 1, wherein an actuable magnet is associated with at least one first unloading station for the purpose of removing cutlery or items of cutlery which are produced from metal, from the the trays or tray-like objects which are fed by the feed conveyor belt.

3. The unloading arrangement as claimed in claim 2, wherein at least one second unloading station is designed for unloading only items of washware of one washware group, which comprises plates, cups and bowls, from the trays or tray-like objects which are fed by the feed conveyor belt, and the at least one wiping device is part of the at least one second unloading station.

4. The unloading arrangement as claimed in claim 3, wherein the first unloading station is located downstream of the second unloading station, as seen in the conveying direction of the feed conveyor belts; or wherein the second unloading station is located downstream of the first unloading station, as seen in the conveying direction of the feed conveyor belt.

5. The unloading arrangement as claimed in claim 1,
wherein an upstream part, as seen in the conveying direction, of the at least one unloading station is designed to unload only washware, including cups and bowls, from the trays or tray-like objects which are fed by the feed conveyor belt.

6. The unloading arrangement as claimed in claim 5,
wherein a downstream part, as seen in the conveying direction, of the at least one unloading station is adjacent and downstream of the upstream part and is designed to unload only washware, including plates or plate-like objects, from the trays or tray-like objects which are fed by the feed conveyor belt.

7. The unloading arrangement as claimed in claim 1,
wherein at least part of the at least one unloading station designed to unload only washware, including plates or plate-like objects, from the trays or tray-like objects which are fed by the feed conveyor belt.

8. The unloading arrangement as claimed in claim 1,
wherein the at least one unloading station is designed to successively unload from the trays or tray-like objects which are fed by the feed conveyor belt washware of the washware group which comprises plates, cups and bowls, depending on the size and/or the shape.

9. The unloading arrangement as claimed in claim 1,
wherein the at least one wiping device includes a first wiping device with a first guide which is vertically spaced apart with reference to the plane in such a way that, when conveyed through the at least one unloading station by the feed conveyor belt, washware of the washware group which comprises cups and bowls, but not cutlery, plates and saucers, or the trays and tray-like objects, hits the first guide and is deflected out of the conveying direction.

10. The unloading arrangement as claimed in claim 9,
wherein the at least one wiping device further includes a second wiping device located downstream of the first wiping device, as seen in the conveying direction of the feed conveyor belt, and has a second guide which is vertically spaced apart with reference to the plane in such a way that, when conveyed through the at least one unloading station by the feed conveyor belt, washware of the washware group which comprises plates and saucers hits the second guide and is deflected out of the conveying direction.

11. The unloading arrangement as claimed in claim 1,
wherein a loading arrangement is associated with at least one unloading station for the purpose of automatically sorting the items of washware which are unloaded from the trays or tray-like objects by the at least one unloading station into a predefined or predefinable conveyor belt of a conveyor dishwasher.

12. A belt conveyor dishwasher, wherein the conveyor dishwasher has at least one conveyor belt for conveying washware through treatment zones of the conveyor dishwasher, and wherein the conveyor dishwasher includes the unloading arrangement as claimed in claim 1.

13. An unloading arrangement for unloading items of washware which are arranged on trays or tray-like objects, wherein the unloading arrangement comprises:
a feed conveyor belt for feeding the items of washware which are arranged on trays or tray-like objects and are to be unloaded; and
multiple unloading stations which are arranged one behind the other, as seen in a conveying direction of the feed conveyor belt;
wherein, for successively unloading the items of washware from the trays or tray-like objects, a predefined or predefinable washware group is associated with each unloading station and each unloading station is designed to unload only items of washware of the associated washware group;
wherein at least one washware pusher device is associated with at least one unloading station, wherein the at least one washware pusher device has a movable manipulator which can be retracted vertically above the feed conveyor belt as required in order to deflect items of washware, in a targeted manner, out of the conveying direction.

14. An unloading arrangement for unloading items of washware which are arranged on trays or tray-like objects, wherein the unloading arrangement comprises:
a feed conveyor belt for feeding the items of washware which are arranged on trays or tray-like objects and are to be unloaded; and
multiple unloading stations which are arranged one behind the other, as seen in a conveying direction of the feed conveyor belt;
wherein, for successively unloading the items of washware from the trays or tray-like objects, a predefined or predefinable washware group is associated with each unloading station and each unloading station is designed to unload only items of washware of the associated washware group;
wherein at least one unloading station has a tilting section in which trays or tray-like objects which are fed by the feed conveyor belt are inclined or can be inclined in relation to horizontal in such a way that items of washware slide off the trays or tray-like objects due to the force of gravity.

* * * * *